United States Patent [19]

Muraguchi

[11] Patent Number: 4,526,503

[45] Date of Patent: * Jul. 2, 1985

[54] SUPPORT STRUCTURE FOR CHECKING AND REPAIRING HEAVY ROTATABLE OBJECTS

[75] Inventor: Yutaka Muraguchi, Nougata, Japan

[73] Assignee: Hoko Sangyo Co., Ltd., Fukuoka, Japan

[ * ] Notice: The portion of the term of this patent subsequent to Jun. 5, 2001 has been disclaimed.

[21] Appl. No.: 573,906

[22] Filed: Jan. 26, 1984

Related U.S. Application Data

[62] Division of Ser. No. 296,736, Aug. 27, 1981, Pat. No. 4,452,558.

[30] Foreign Application Priority Data

Mar. 5, 1980 [JP] Japan .............................. 55-28434[U]

[51] Int. Cl.³ .......................... F16M 11/14; B23B 5/20
[52] U.S. Cl. .................. 414/433; 51/237 R; 248/580; 269/79; 269/289 MR; 269/296; 269/310; 384/192
[58] Field of Search ............. 51/237 R; 248/580, 583; 269/75, 289 MR, 296, 309, 310, 902; 384/192, 193, 199, 206; 414/431, 432, 433

[56] References Cited

U.S. PATENT DOCUMENTS

| 2,417,678 | 3/1947 | Cox | 414/433 |
|---|---|---|---|
| 2,645,108 | 7/1953 | Smith | 384/199 X |
| 3,371,970 | 3/1968 | Beerli | 384/193 |
| 3,447,074 | 5/1969 | Sower et al. | 414/431 X |
| 3,830,488 | 8/1974 | Wilger et al. | 269/296 |
| 3,860,228 | 1/1975 | Cronier | 269/75 X |
| 4,202,539 | 5/1980 | Polastri et al. | 269/296 X |
| 4,345,861 | 8/1982 | Aarseth | 384/206 X |
| 4,452,558 | 6/1984 | Muraguchi | 414/433 |

Primary Examiner—Randolph Reese
Assistant Examiner—David F. Hubbuch
Attorney, Agent, or Firm—Jordan and Hamburg

[57] ABSTRACT

A support structure utilized for checking and repairing rotatable objects of various kinds, such as a turbine for power generator or a blower fan, includes a roll support base which rotatably supports one end of the rotatable object thereon by means of a pair of rolls which are supported on an adjustable surface plate of a base frame by means of a spherical support mechanism. Due to the spherical support mechanism, the rolls on the support bases can uniformly support both ends of the rotatable object without imparting any thrust to the rolls even when horizontal levelling is not achieved.

7 Claims, 8 Drawing Figures

SUPPORT STRUCTURE FOR CHECKING AND REPAIRING HEAVY ROTATABLE OBJECTS

This is a division of application Ser. No. 296,736, filed Aug. 27, 1981, now U.S. Pat. No. 4,452,558 issued June 5, 1984.

BACKGROUND OF THE INVENTION

This invention relates to support structures for checking and repairing rotatable objects, and more particularly to support structures which can support largesized or gigantic rotors such as turbine rotors for power generators or blower fans in the checking or repairing operation.

Conventionally, for example, the levelling of a turbine for power generator which is mounted on a base, frame is conducted such that the roll-support bases, which rotatably support the respective ends of the turbine rotor, and are adjusted for levelling thereof by rotating adjusting bolts or levelling bolts. However, the foundation on which such roll-support bases are mounted is not generally provided with the rigid supports. Therefore, even when accurate horizontal levelling of the roll support bases is achieved before the turbine is mounted on the roll support bases, once the turbine is bridged and held by the roll support bases, the floor surface of the foundation is distorted or warped resulting in poor levelling. Such poor levelling produces a considerable degree of thrust on the supporting rolls on the roll support bases, and such thrust is further enhanced by the deflection of the rotor shaft which is caused by the weight of the turbine. Thereby, when the turbine is rotated on the axis thereof along with the rotation of the support rolls, the turbine moves in an axial direction along with the rotation thereof so that the checking or repairing of the turbine becomes extremely difficult and cumbersome. Furthermore, in an extreme case, the rotor shaft of the turbine suffers partial intensive frictional wear resulting in rupture of the rotor shaft. This makes the checking or repairing operation extremely dangerous. For preventing the occurrence of such a situation, further or secondary levelling must be performed after the mounting of the turbine on the roll support bases and such-relevelling necessitates a great deal of time and labor.

Accordingly, it is an object of the present invention to provide support structures for checking and repairing a rotor which can resolve the aforementioned defects of conventional support structures and which can readily, accurately and automatically provide the best support condition for the roll support bases.

In summary, the present invention discloses a support structure for checking and repairing a rotor comprising a pair of parallel spaced-apart rotor support rolls rotatably supporting one end of the rotor, a roll support base mounting a pair of rotor support rolls thereon and an adjustable surface plate disposed below the roll support base for supporting the roll support base and a base frame disposed below the surface plate for supporting the surface plate, wherein the improvement is characterized in that a spherical support mechanism is disposed between the roll support base and the adjustable surface plate so as to allow the roll support base to tilt in any radial direction on the spherical support mechanism. Due to the spherical support mechanism, the rolls on the support bases can uniformly support both ends of the impeller rotor without imparting any thrust to the rolls even when horizontal levelling is not achieved.

DESCRIPTION OF THE PREFERRED EMBODIMENTS

Figure 1:
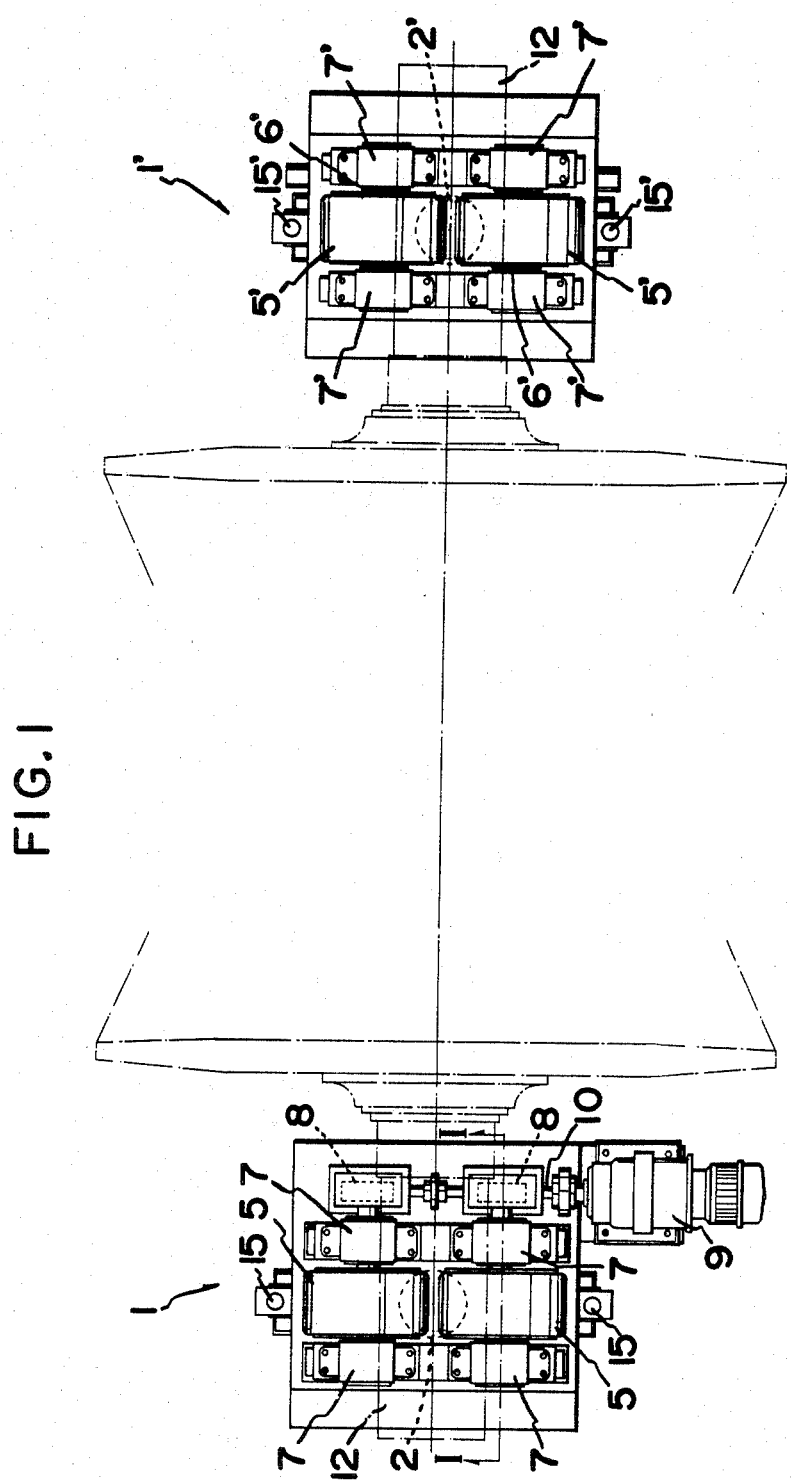
FIG. 1 is a plan view of a support structure for checking and repairing a rotor according to the present invention.
Figure 2:
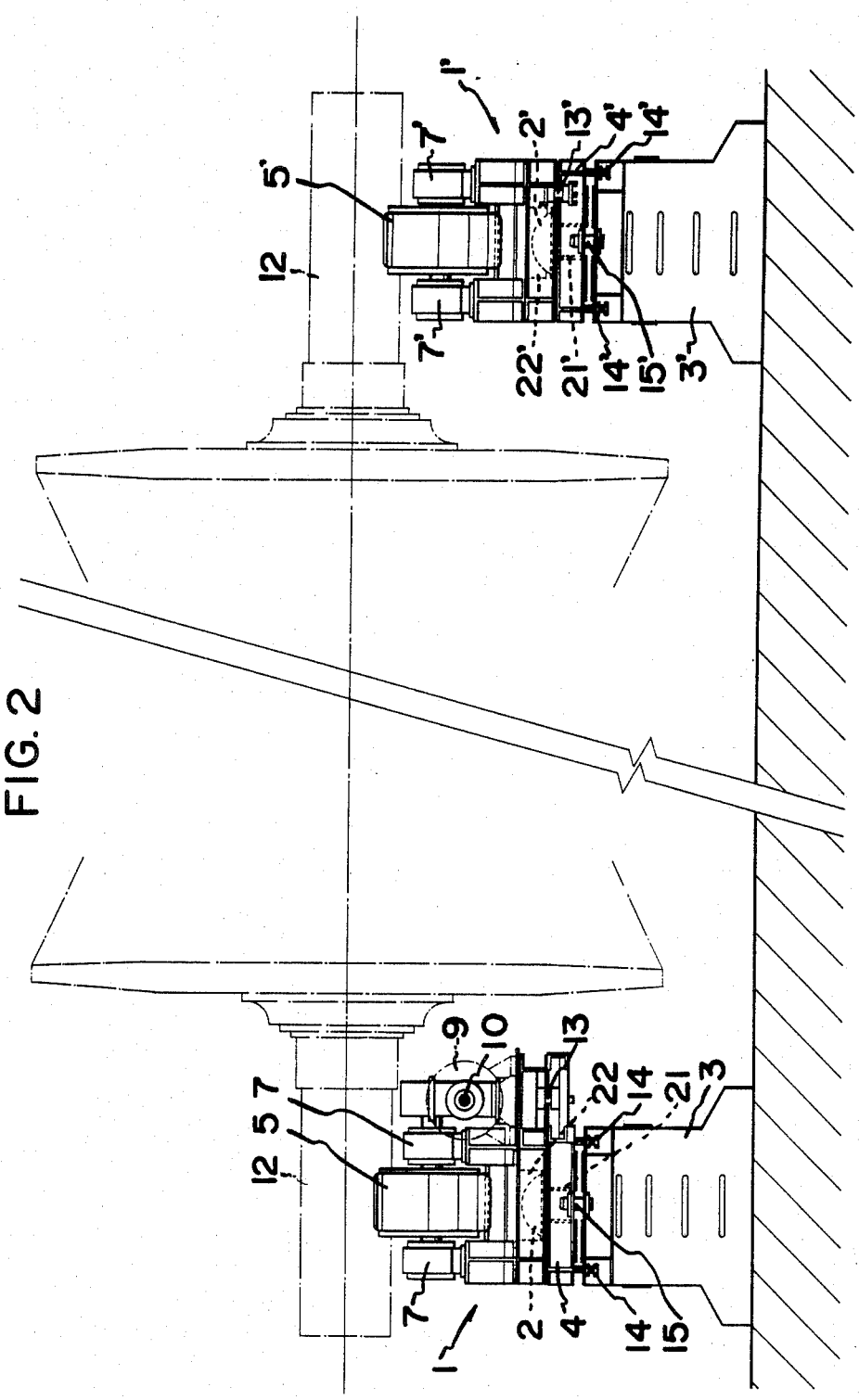
FIG. 2 is a front view of the above support structure.
Figure 3:
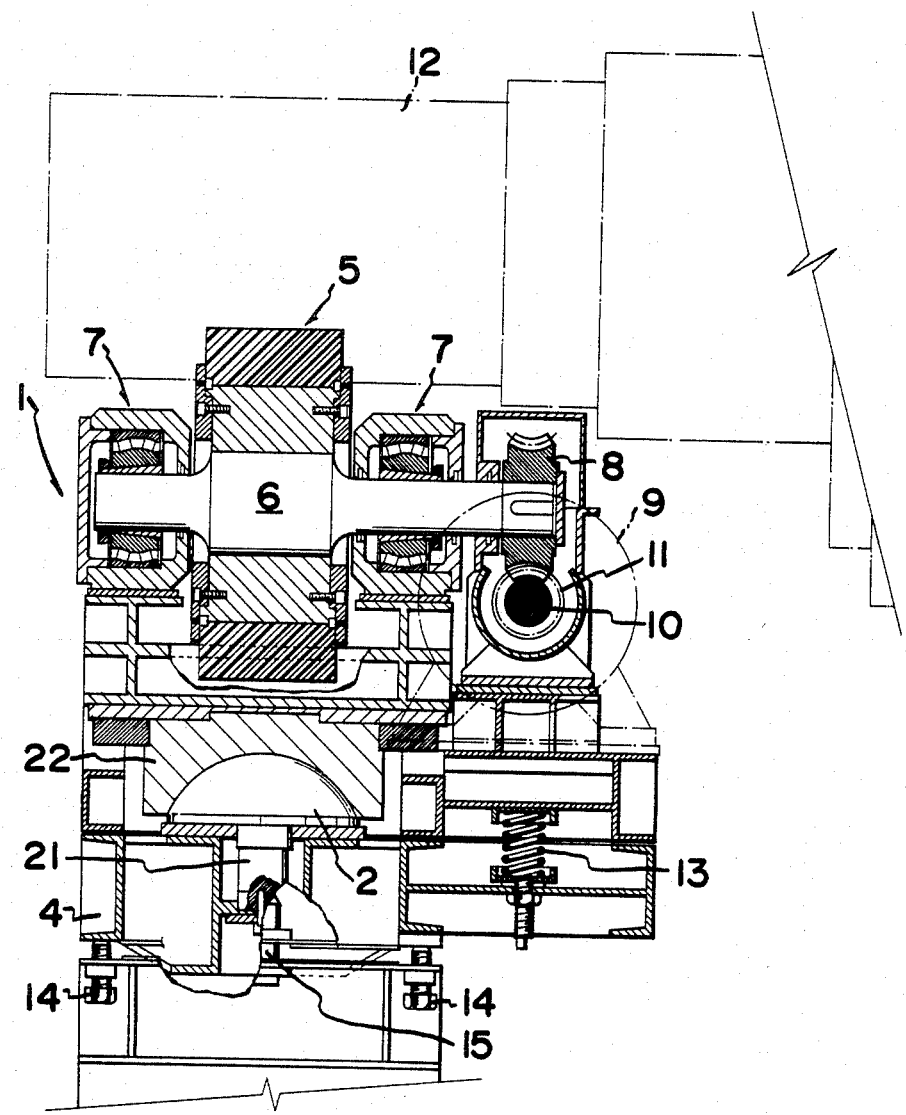
FIG. 3 is an enlarged cross sectional view of FIG. 1 taken along the line I—I of FIG. 1.
Figure 4:
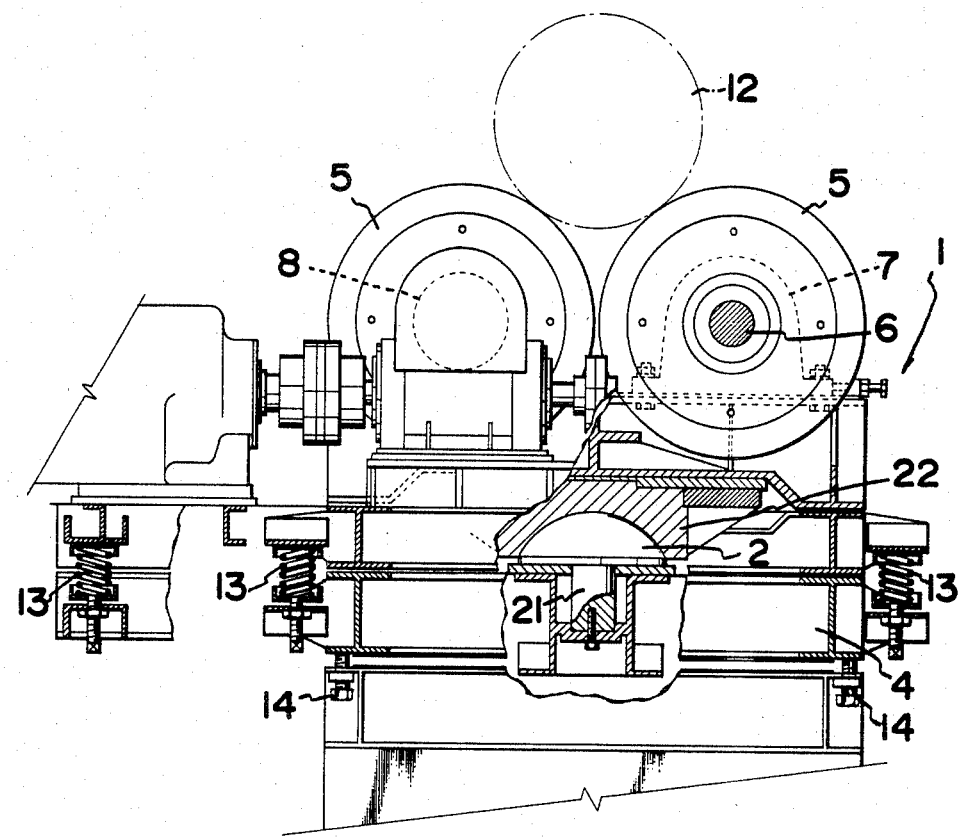
FIG. 4 is an enlarged side view with parts broken away and in section showing the above support structure.
Figure 5:
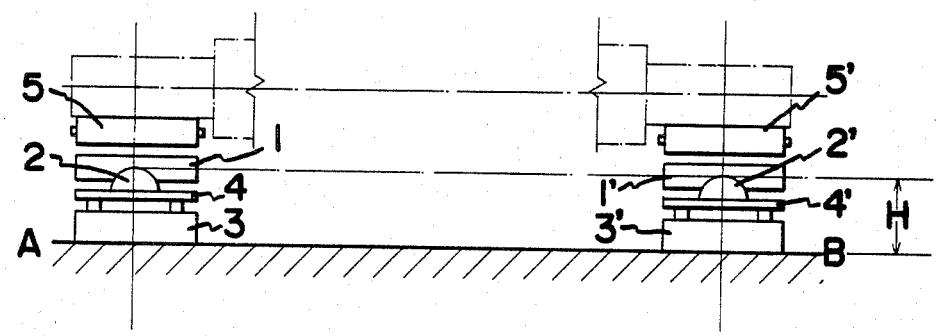
FIG. 5 and FIG. 6 are explanatory front views of the above support structure before and after the turbine is mounted on the support structures.

In The drawings, numeral 1 indicates a drive-side roll support base while numeral 1' indicates a follower-side roll support base. Roll support bases 1, 1' are supported on adjustable surface plates 4, 4' of base frames 3, 3' by means of spherical support mechanisms 2, 2' respectively.

A pair of drive rolls 5, 5 are mounted on the drive-side roll support base 1 in a parallel-spaced-apart manner, and rotary shafts 6, 6 on which drive rolls 5, 5 are fixedly secured have their ends rotatably supported by bearings 7, 7 which are mounted on the drive-side roll support base 1. The rotary shafts 6, 6 have extensions at corresponding ends thereof and worm wheels 8, 8 are fixedly mounted on the respective extensions of the rotary shafts 6, 6. A power transmission shaft 10 is disposed on the roll support base 1 at right angle to the rotary shaft 6, 6 and has the proximal end thereof connected to the output shaft of a geared motor 9 and the distal end provided with a pair of axially spaced-apart worms 11, 11 which mesh with worm wheels 8, 8.

Due to such construction, along with the actuation of the geared motor 9, the drive rolls 5, 5 are simultaneously rotated in the same direction so as to rotate the one end of the turbine rotor 12 at a predetermined low speed e.g. 0.3 r.p.m.

The follower-side roll support base 1' is also provided with a pair of follower rolls 5', 5' which are fixedly secured to rotary shafts 6', 6', which, in turn, have their ends rotatably supported by bearings 7', 7'. However, no drive mechanism is disposed on the roll support frame 1'. Due to the above construction, the follower-side roll support base 1' rotatably supports the other end of the turbine rotor 12.

The drive rolls 5, 5 and the follower rolls 5', 5' are preferably made of specially reinforced plastic. It is also preferable to provide a weight balance means on the drive-side roll support base 1.

Referring now to the spherical support mechanism 2, 2', spherical support mechanisms 2, 2' are disposed at the center of the respective roll support base 1, 1' and each mechanism comprises vertical support shaft 21, 21' which has the top or upper end thereof formed approximately in a semi-spherical shape and spherical-recessed pads 22, 22' are uniformly engaged by the semi-spherical top of the vertical support shafts 21, 21'. Although, in the drawings, the vertical shafts 21, 21' are mounted on the adjustable surface plates 4, 4' disposed above the base frames 3, 3', and the spherically-recessed pads 22, 22' are mounted at the center on the roll support bases 1, 1', the vertical shafts 21, 21 and pads 22, 22' can be mounted in a reverse manner. A suitable lubricant may be applied to the contact surface of the spherical support mechanisms 2, 2'. It is also preferable to provide compression springs 13, 13 at regular intervals between the roll support bases 1, 1' and adjustable surface plates 4, 4' so as to enable the roll support bases 1, 1' to resiliently return and take a horizontal position parallel to the surface plates 4, 4'. A suitable gap or clearance must be provided between the adjustable surface plates 4, 4' and the roll support bases 1, 1' so as to allow the roll support bases 1, 1' to sufficiently tilt or oscillate in all radial directions on the spherical support mechanisms 2, 2'. Between the adjustable surface plates 4, 4' and the base frames 3, 3', a plurality of adjust or levelling bolts 14, 14' are disposed so as to effect the vertical adjustment of the roll support bases 1, 1'. Numerals 15, 15' indicate guide pins which facilitate the above vertical adjustment. The vertical adjusting mechanism, however, does not constitute a part of the present invention.

The manner in which the support structures of the present invention effect the levelling operation is hereinafter disclosed.

Before bridging or mounting the turbine rotor on the support structures, the vertical adjustment is performed so as to provide horizontal levelling of the peaks of the spherical support mechanisms 2, 2'. Such vertical adjustment is performed by manipulating the levelling bolts 14, 14' so as to adjust the level of adjustable surface plates 4, 4' relative to the base frames 3, 3'.

After the above vertical adjustment which is conducted even in the checking or repairing operation with conventional support structures, suitable wedges (not shown in the drawings) are driven into the clearances or spaces between the adjustable surface plates 4, 4' and the base frames 3, 3' so as to firmly and rigidly secure the adjustable surface plates 4, 4 to base frames 3, 3'. Thereafter both ends of the rotor 12 of the turbine are placed on the drive rolls 5, 5 and the follower rolls 5', 5' respectively.

Figure 6:
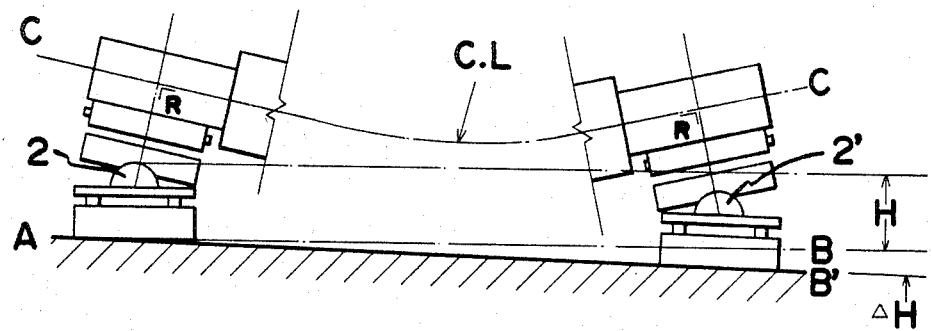

Due to the weight of the turbine, the floor surface may distort or warp thus making the previously-established horizontal levelling have an error $\Delta H$ as shown in FIG. 6.

However, since the support structures of the present invention have the above-mentioned construction, so long as the above error $\Delta H$ falls in a range of allowance, the roll support bases 1, 1 automatically incline in a desired radial direction so as to absorb the above error due to the provision of the spherical support mechanisms 2, 2', and support the rotor shaft 12 at right angles to the axis of the rotor shaft 12 which is warped due to the weight of the turbine.

Figure 7:
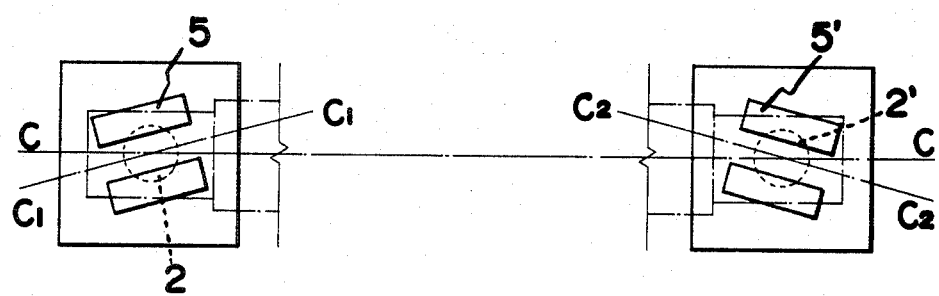
FIG. 7 and FIG. 8 are explanatory plan views of the above support structures before and after the turbine is mounted on the support structure.
Figure 8:
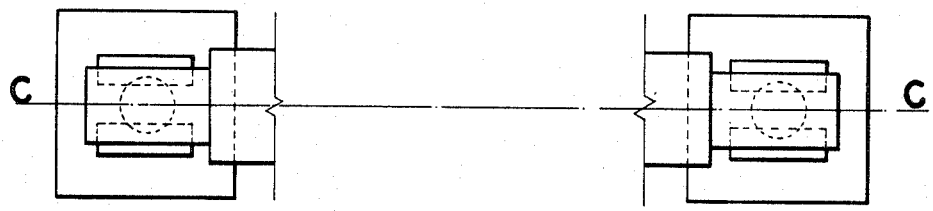

The same goes for the lateral direction. Namely, the axes $C_1$—$C_1$ and $C_2$—$C_2$ of rolls may not be in complete alignment with the axis C—C which connects the peaks of the spherical support mechanisms before mounting the turbine on the support structures as shown in FIG. 7. However, due to the spherical support mechanisms, once the turbine is placed on the support-structures, the axes $C_1$—$C_1$ and $C_2$—$C_2$ of the support rolls on the roll support bases are automatically aligned with the axis C—C of the support structures as shown in FIG. 8.

Therefore, even when the drive rolls 5, 5 are driven so as to rotate the turbine rotor, the turbine rotor rotates on the same axis thereof which does not fluctuate at all throughout the checking or repairing operation. This implies that the rotation of the turbine rotor does not produce any axial movement thereof and that the turbine rotor has both ends thereof uniformly and evenly supported by all of the rolls by surface contact.

As has been described heretofore, the support structures according to the present invention can drastically reduce the time and labor necessary for the levelling operation.

Furthermore, the wear of the rolls for supporting the turbine shaft can be also minimized.

What we claim is:

1. A support device for checking and repairing a heavy rotatable object such as a large turbine rotor comprising a pair of self-aligning support structures for rotatably supporting both ends of a shaft of said heavy rotatable object, said support structures being disposed at a distance from each other to provide a space therebetween for accommodating said heavy rotatable object, each of said self-aligning support structures comprising:
   (i) a base frame set on a floor,
   (ii) a roller support base mounted on said base frame;
   (iii) a pair of parallel-spaced-apart support rollers mounted on said roller support base and rotatably supporting one end of the shaft of said heavy rotatable object, each of said pair of parallel-space-apart support rollers having its own shaft rotatable about generally horizontal axes,
   (iv) a single partially spherical support mechanism interposed between said base frame and each of said roller support bases so as to allow said roller support base to tilt in any radial direction on said base frame, each of said partially spherical support mechanisms comprising a support member having a partially spherical surface, each of said partially spherical support mechanisms having a generally vertical axis passing generally through the center of the respective partially spherical surface with an extension of said vertical axis symmetrically bisecting the distance between the horizontal axes of the respective pair of said parallel-spaced-apart rollers, and
   (v) a drive mechanism with a reduction means operably coupled with said support rollers on one of said roller support bases and operable to rotate said heavy rotatable object at a low speed,
   whereby when both ends of said shaft of said heavy rotatable object are placed on said support rollers of said respective support structures, the axes of each of said pair of support roller shafts are automatically aligned in both horizontal and vertical directions to be parallel with the shaft of said heavy rotatable object even when the shaft of said heavy rotatable object is deflected due to its own weight, thus assuring sufficient and uniform support of said heavy rotatable object by said support rollers of said support structure.

2. A support device according to claim 1, wherein said partially spherical support mechanism comprises a generally vertical support shaft having an upper end portion thereof formed with said partially spherical surface and a pad having a partially spherical recess portion mating with said partially spherical surface of said support shaft.

3. A support device according to claim 2, wherein said vertical support shaft is mounted on said base frame and said pad is mounted on said roller support base.

4. A support device according to claim 2, wherein said base frame and said roller support base are spaced from one another in the areas outwardly of said partially spherical surface and said partially spherical recess portion to permit tilting between said base frame and said roller support base.

5. A support device according to claim 4 further comprising spring means disposed in the space between said base frame and said roller support base.

6. A support device according to claim 1, wherein each of said support bases has four bearings with two of said four bearings rotatably supporting the longitudinal end portions of one of said roller shafts and the other two of said four bearings rotatably supporting the longitudinal ends of the other of said roller shafts.

7. A support device for checking and repairing a heavy rotatable object of the type which tends to deflect due to its own weight such as a large turbine rotor, comprising a pair of self-aligning support structures for rotatably supporting both ends of a shaft of said heavy rotatable object, said support structures being disposed at a distance from each other to provide a space therebetween for accommodating said heavy rotatable object, each of said self-aligning support structures comprising a base frame set on a floor, a roller support base mounted on said base frame, a pair of parallel-spaced-apart support rollers mounted on said roller support base and rotatably supporting one end of the shaft of said heavy rotatable object, each of said pair of parallel-spaced-apart support rollers having its own roller shaft rotatable about generally horizontal axes, each of said support bases having four bearings with two of said four bearings rotatably supporting the longitudinal end portions of one of said roller shafts and the other two of said four bearings rotatably supporting the longitudinal ends of the other of said roller shafts, a single partially spherical support mechanism interposed between said base frame and said roller support base so as to allow said roller support base to tilt in any radial direction on said base frame, said partially spherical support mechanism comprising a generally vertical support shaft having an upper end portion thereof formed with a partially spherical surface and a pad having a partially spherical recess portion mating with said partially spherical surface of said support shaft, said vertical support shaft being mounted on said base frame and said pad being mounted on said roller support base, said vertical support shaft having a vertical axis passing through the center of said partially spherical surface with an extension of said vertical axis symmetrically bisecting the distance between the horizontal axes of the respective pair of said parallel-spaced-apart rollers, said base frame and said roller support base being spaced from one another in the areas outwardly of said respective partially spherical surface and said partially spherical recess portion to permit tilting between said base frame and said roller support base, spring means disposed in the space between said base frame and said roller support base, and a drive mechanism with a reduction means operably coupled with said support rollers on one of said roller support bases and operable to rotate said heavy rotatable object at a low speed, whereby when both ends of said shaft of said heavy rotatable object are placed on said support rollers of said respective support structures, the axes of each of said pair of support roller shafts are automatically aligned in both horizontal and vertical directions to be parallel with the shaft of said heavy rotatable object even when the shaft of said heavy rotatable object is deflected due to its own weight, thus assuring sufficient and uniform support of said heavy rotatable object by said support rollers of said support structure.

* * * * *